United States Patent [19]

Pyron et al.

[11] Patent Number: 5,759,350
[45] Date of Patent: Jun. 2, 1998

[54] PAPERMAKING PROCESS DRY END SLABBING METHOD

[76] Inventors: Donald R. Pyron, 2315 Edgewood, El Dorado, Ark. 71730; Chris E. Pyron, 450 Renee Dr., Tuscumbia, Ala. 35674

[21] Appl. No.: 686,314

[22] Filed: Jul. 25, 1996

[51] Int. Cl.⁶ .............. B26F 3/00; B65H 73/00; D21F 1/66
[52] U.S. Cl. .............. 162/191; 83/53; 83/56; 83/177; 83/614; 83/924; 162/194
[58] Field of Search .............. 83/53, 56, 177, 83/614, 924; 162/120, 191, 194

[56] References Cited

U.S. PATENT DOCUMENTS

| | | | |
|---|---|---|---|
| 1,838,011 | 12/1931 | Peter | 83/924 X |
| 3,236,723 | 2/1966 | Whiteside | 162/191 X |
| 3,245,302 | 4/1966 | Bayley | 83/924 X |
| 3,245,868 | 4/1966 | Espenmiller et al. | 162/191 X |
| 4,152,958 | 5/1979 | Bogert | 83/177 X |
| 4,506,575 | 3/1985 | McCay et al. | 83/924 X |
| 4,864,906 | 9/1989 | Hall | 83/924 X |
| 4,906,334 | 3/1990 | Evens | 162/191 X |
| 4,941,380 | 7/1990 | Lockwood | 83/614 X |

FOREIGN PATENT DOCUMENTS

| | | | |
|---|---|---|---|
| 2647386 | 11/1990 | France | 83/177 |
| 6246698 | 9/1994 | Japan | 83/177 |

*Primary Examiner*—Eugenia Jones
*Attorney, Agent, or Firm*—Stephen D. Carver

[57] ABSTRACT

A papermaking process dry end slabbing method using high pressure fluid cutting moves generally parallel to a spool at the end of the papermaking process. The process removes multiple layers of unwanted paper which may be of the wrong grade, poor quality, mis-spooled or otherwise damaged from the spool. A first method uses a carriage mounting an articulated cutter. Vertically extensible pneumatic or hydraulic cylinders and anti-oscillation and thrust support telescopic stanchions displace the cutter in response to input from a set of sensors used to detect a surface of the paper. A track embedded in the floor guides the carriage generally parallel to the spool. The track can be a geared rack, a rail, a channel defined in the floor or a wire embedded in the floor. A driven pinion gear or wheel, undriven foot or wheel, or sensing equipment disposed within the carriage interacts with the track to guide the carriage. Alternatively, the carriage wheels may be driven or a winch and cable can provide transverse displacement of the carriage along the spool. A second method moves an overhead carriage winch along an overhead beam. The high pressure fluid cutter is mounted to an extensible column which extends and retracts in response to the sensors. The overhead carriage is moved along the beam by a cable and winch arrangement or chain and sprocket setup.

12 Claims, 8 Drawing Sheets

PAPERMAKING PROCESS DRY END SLABBING METHOD

BACKGROUND OF THE INVENTION

The present invention broadly relates to papermaking processes. Specifically, the present invention is a Papermaking Process Dry End Slabbing Method.

Over the years, innumerable patents have been issued on papermaking processes. As one skilled in the art would expect, numerous patents have been issued on cutting devices associated with papermaking.

Various types of devices are used to cut a single thickness of paper during the papermaking process. A guillotine blade is used in Rodriguez, U.S. Pat. No. 5,046,675. A laterally traveling blade is used in Keferstein, U.S. Pat. No. 3,213,735. The latter patent discloses a cable mechanism to move the blade across the paper web. A laser cutter is disclosed in Quirk, U.S. Pat. No. 3,582,466. Phillips, U.S. Pat. No. 5,202,000 discloses the use of water in a "saveall" device to clean the forming wire in an early step of the papermaking process.

Various U.S. Patents disclose the use of high pressure water cutters, or water knives, in several locations during the papermaking process. The water cutters are disclosed in Chupka, U.S. Pat. No. 5,234,172; Peltola, U.S. Pat. No. 4,931,140; and Eckelman, U.S. Pat. No. 3,625,813. The Chupka device cuts the edges of "broke" paper in the papermaking process for rejoining. The Peltola device cuts the edge of the paper. Eckelman shows a transverse paper cutter operated via a cable. This device is also articulated, allowing it to be swung out of the way. A combination laser and water cutter is disclosed in Gangemi, U.S. Pat. No. 5,068,513. The water cutter cuts the edge of the paper and the laser cutter cleans the protruding fibers. Volle, U.S. Pat. No. 4,343,211 discloses a hose setup for a jet cutter used to cut across the web of paper during a papermaking process.

Cutters disposed in the latter portion of the papermaking process are disclosed in Mauranen, U.S. Pat. No. 4,566,944; Peiffer, U.S. Pat. No. 4,904,344; Fissmann, U.S. Pat. No. 5,248,390; and Koponen, U.S. Pat. No. 5,445,055. Mauranen uses a gas flow to stabilize the paper web for cutting. Peiffer discloses the use of high pressure air to push the web of paper against a "doctor" blade for cutting a leading edge of paper prior to feeding onto a roll. Fissmann uses rollers to tension the paper web for cutting. Koponen uses a water jet to push the paper against a wire to cut it.

High pressure fluid cutters are sometimes used to cut material from a roll or spool. Giardini, U.S. Pat. No. 3,640,163 shows a filament cutting method employing a jet cutter to cut filament material from a spool. Bogert, U.S. Pat. No. 4,152,958, discloses a process for cutting rolled material into strips using a fluid jet cutter to cut a rotating roll of plastic material. The cutter and rotation system for the roll of material are mechanically interconnected to provide proper timing for the cutting process.

Krofta, U.S. Pat. No. 3,517,578 discloses the use of a water jet to cut paperboard mat from a roller during paperboard manufacture. The paper mat is built up on a forming roll until it reaches a specified thickness and then a set of jet cutters is used to cut the still wet material free for further processing. The Krofta device is intended to cut material from a rotating roller using multiple jets to cut in an arch coincident with the rotating roller to produce a straight cut.

As is evident from the above prior art discussion, water is used in various ways and in many different locations on a large papermaking machines to cut or aid in cutting paper. The prior art discloses numerous cutters that cut a single layer of paper during the papermaking process. In most stages of the papermaking process there is no need for a cutter to do otherwise.

Conversely, the prior art fails to disclose a method employing a high pressure jet cutter to cut more than one layer of dry paper at the dry end of a papermaking process. In most stages of the papermaking process there is no need for such cutting. However, during the latter portion of the process, as near-finished dry product is wound upon a reel spool, it is often necessary to remove unwanted paper which may be of the wrong grade. Accumulated paper to be removed may be of improper quality, or it may be misfed or otherwise damaged while winding upon the spool. There are usually multiple layers of paper on such a spool and it is necessary to cut the paper free. This process is; known as "slabbing". Once the paper is cut free of the spool, it falls onto a tiltable pulper dump table which transports the paper into the pulper pit for integration back into the paper pulp at an earlier point in the papermaking process.

Prior art methods of slabbing are manually labor intensive. An individual uses a sharp bladed knife to cut the paper, by hand, from the spool. Cuts are made through several sheets transversely along the spool. As these spools are relatively long, the dangers associated with using a sharp knife while walking along the length of the spool are obvious. The inefficiency is also apparent. Hence, it is desirous to provide a slabbing method for the dry end of papermaking processes which provides automated, multilayer, transverse paper cutting using a high pressure fluid cutter.

SUMMARY OF THE INVENTION

Our Papermaking Process Dry End Slabbing Method is used to transversely cut or slab multiple layers of unwanted paper which may be of the wrong grade, poor quality, mis-spooled or otherwise damaged from a stationary spool for reprocessing. It is fully automated. The surface of the paper disposed on the spool is detected, and three dimensional movement is used to properly position a high pressure fluid cutter for efficient multilayer, transverse cuts. Use of our device promotes efficiency and safety, eliminating the labor intensive wielding of sharp blades by walking workers.

Our slabbing method involves moving a high pressure fluid cutter generally parallel to and in close proximity to a spool having paper to be slabbed wound around it. As the paper falls free of the spool it is caught by a pulper dump table which redirects it to the initial stages of the papermaking process for repulping and reintroduction into the papermaking process.

Two primary embodiments of devices embodying our slabbing process are disclosed. A first device is comprised of a cutter mounted, via a set of pneumatic or hydraulic cylinders, to a wheeled carriage. The cylinders provide vertical and horizontal displacement of the cutter. The high pressure fluid cutter, such as a water knife, has the advantage of suppressing dust and never needs sharpening. Additionally it is adjustable by replacing the cutter's nozzle or the jet within the nozzle to vary the size of the cutter orifice. The water absorbed by the paper is not detrimental to process as the paper slabbed free will be redirected to the pulper where it will be mixed with water. Telescopic stanchions stabilize the vertical cylinders and in turn the cutter. Alternatively, angle adjustments may be provided for the cutter. Such angular adjustments may be automated employing a solenoid or cylinder in conjunction with a crank mounting the cutter. Manual adjustment is also an alternative.

Movement of the carriage is directed generally parallel to and adjacent the paper spool. The preferred embodiment employs a rack gear track embedded in the floor adjacent the spool. The carriage has a driven pinion gear mounted under it to engage the rack and move the carriage parallel to the spool.

Alternative embodiments guide the carriage using a track or signal emitting wire or similar system embedded in the floor or a channel defined in the floor. A wheel or foot extending downwardly from the carriage engages the track or channel as sensing equipment in the carriage steers the carriage to follow the wire. The alternative embodiments of the carriage may be self propelled or may be drawn via one or more cables and/or chains by one or more winches mounted beyond the ends of the spool. If self propelled, either the wheels or the track contacting wheel may be driven.

A second device embodying our slabbing method is comprised of an overhead carriage which rides on an overhead track beam. The high pressure fluid cutter is mounted on an extensible column extending downwardly from the body of the overhead carriage. A drive vertically indexing with the column extends and retracts the cutter. Alternatively, the column can be an extensible hydraulic or pneumatic cylinder. The carriage can be moved along the beam by one or more winch and cable arrangements or by a chain and driven sprocket arrangement.

Both devices sense the paper on the spool using contact limit switches, which contact the paper, if present on the spool, to indicate when and where the cutter should begin cutting. Alternatively, "electric eye" or other optical systems can be used to sense the paper disposed on the spool. The cylinders or similar devices used to adjust the position of the cutter are preferably controlled by a programmable logic controller using the data from the sensors. Alternatively the sensors can directly control valves or the like to adjust the cylinders or column to position the cutter.

Therefore, a primary object of the present invention is to provide a papermaking process dry end slabbing method.

Specifically, an object of the present invention is to provide a slabbing method which provides automated, multilayer, transverse paper cutting during the later stages of a papermaking process.

An object of the present invention is to provide a slabbing method which provides economical multilayer cutting of paper from a spool for reprocessing.

Specifically, an object of the present invention is to provide a slabbing method which slabs paper from a spool in such a manner that the paper can be caught by a tiltable pulper dump table which in turn transports the paper to the pulper pit for reintegration into the pulping step of the papermaking process.

An object of the present invention is to provide a slabbing method which employs three dimensional movement of the cutter.

More specifically, an object of the present invention is to provide a slabbing method which is automated, sensing the surface of paper disposed on a spool and using three dimensional movement to properly position its cutting method to provide efficient multilayer transverse cuts.

An object of the present invention is to provide a slabbing method which employs a high pressure fluid cutter to cut the paper from a spool.

A related object of the present invention is to provide a slabbing method which employs a high pressure fluid cutter thereby suppressing the production of dust during the slabbing operation.

A more specific object of the present invention is to provide a slabbing method which employs a water knife to cut multiple layers of paper from a spool.

An object of the present invention is to provide a slabbing method which is gear driven generally parallel with and adjacent to a spool.

An object of the present invention is to provide a slabbing method which is mechanically driven generally parallel with and adjacent to a spool.

An object of the present invention is to provide a slabbing method which is electrically driven generally parallel with and adjacent to a spool.

An object of the present invention is to provide a slabbing method which is guided by a tracking mechanism embedded in the floor parallel with and adjacent to a spool to eliminate any obstructions on the floor.

An object of the present invention is to provide a slabbing method which is guided by an overhead track that is parallel with and adjacent to a spool.

An object of the present invention is to provide a slabbing method which is guided by a wire or the like embedded in the floor parallel with and adjacent to a spool to eliminate any obstructions on the floor.

An object of the present invention is to provide a slabbing method which is guided by a channel defined in the floor parallel with and adjacent to a spool.

An object of the present invention is to provide a slabbing method which is guided by a track embedded in the floor parallel with and adjacent to a spool.

An object of the present invention is to provide a slabbing method which provides economical automated slabbing, replacing labor intensive and dangerous manual slabbing.

An object of the present invention is to provide a slabbing method which provides a safe alternative to manual slabbing by avoiding the manual manipulation of sharp knifes by walking individuals.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
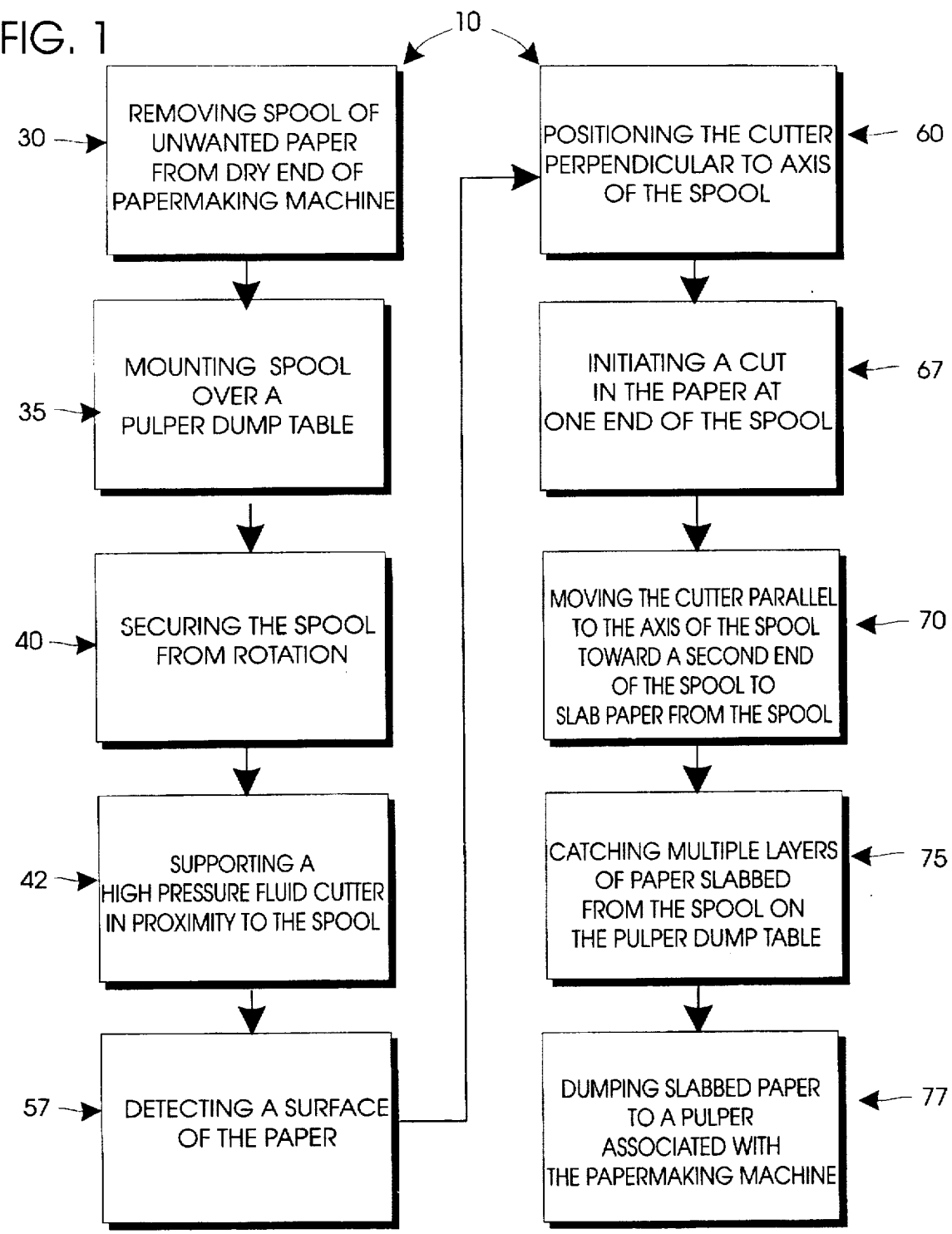
FIG. 1 is a flow chart illustrating the steps involved in our Papermaking Process Dry End Slabbing Method.

With reference now to the accompanying drawings, FIG. 1, a flow chart, is intended to broadly illustrate the steps of our Papermaking Process Dry End Slabbing Method. The slabbing method is broadly designated by the reference numeral 10. The method 10 employs a high pressure cutter 12 supported adjacent a spool 15 near the end of the papermaking process, adjacent the take up reel 18 (FIGS. 3,8) to slab, or cut multiple layers of unwanted paper 20 which may be of the wrong grade, poor quality, misfed or otherwise damaged from the spool 15. The outermost layers of paper wound about the radial periphery of the spool 15 are subject to slabbing by the cutter 12, which is displaceable in several directions relative to the spool. For example, the cutter 12 (FIG. 2) may be moved towards or away from the spool horizontally. It can be displaced radially, relative to the cylindrical spool periphery, to establish a selected cutting point beneath the top of the spool. The cutter is also displaced along a path generally parallel with the spool during slabbing. Further the cutter may be elevated vertically upwardly or downwardly. The slabbed paper 22B is redirected, via a tiltable pulper dump table 25, to the initial stages of the papermaking process for reintroduction into the pulper portion of the process. The spool 15 comprises a first end 15A, (FIG. 2), an opposite end 15B, and a longitudinal axis 15C. Paper that has been separated from the spool drops downwardly in response to gravity.

Figure 3:
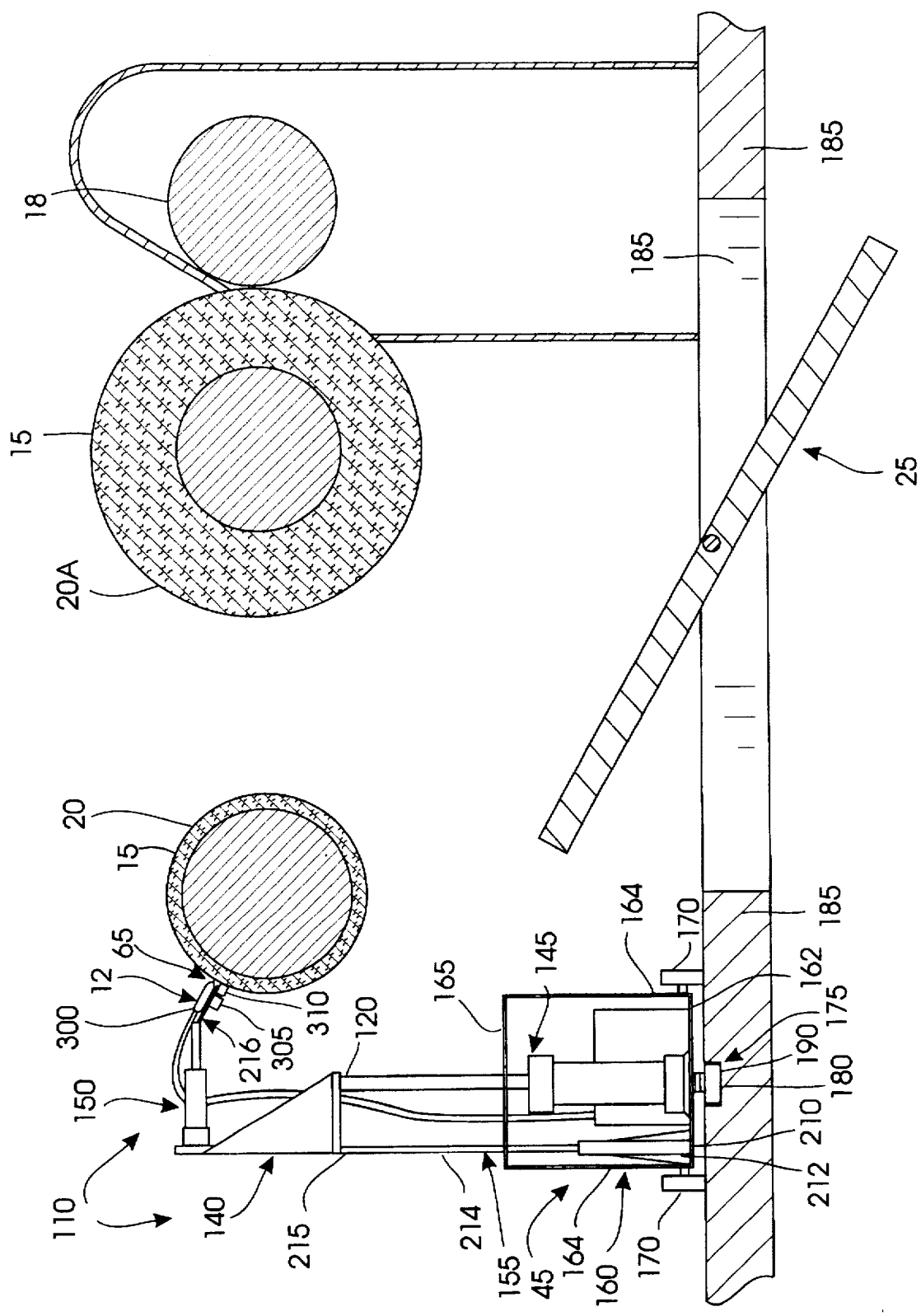
FIG. 3 is a partially fragmented side elevational environmental view of the first device.
Figure 4:
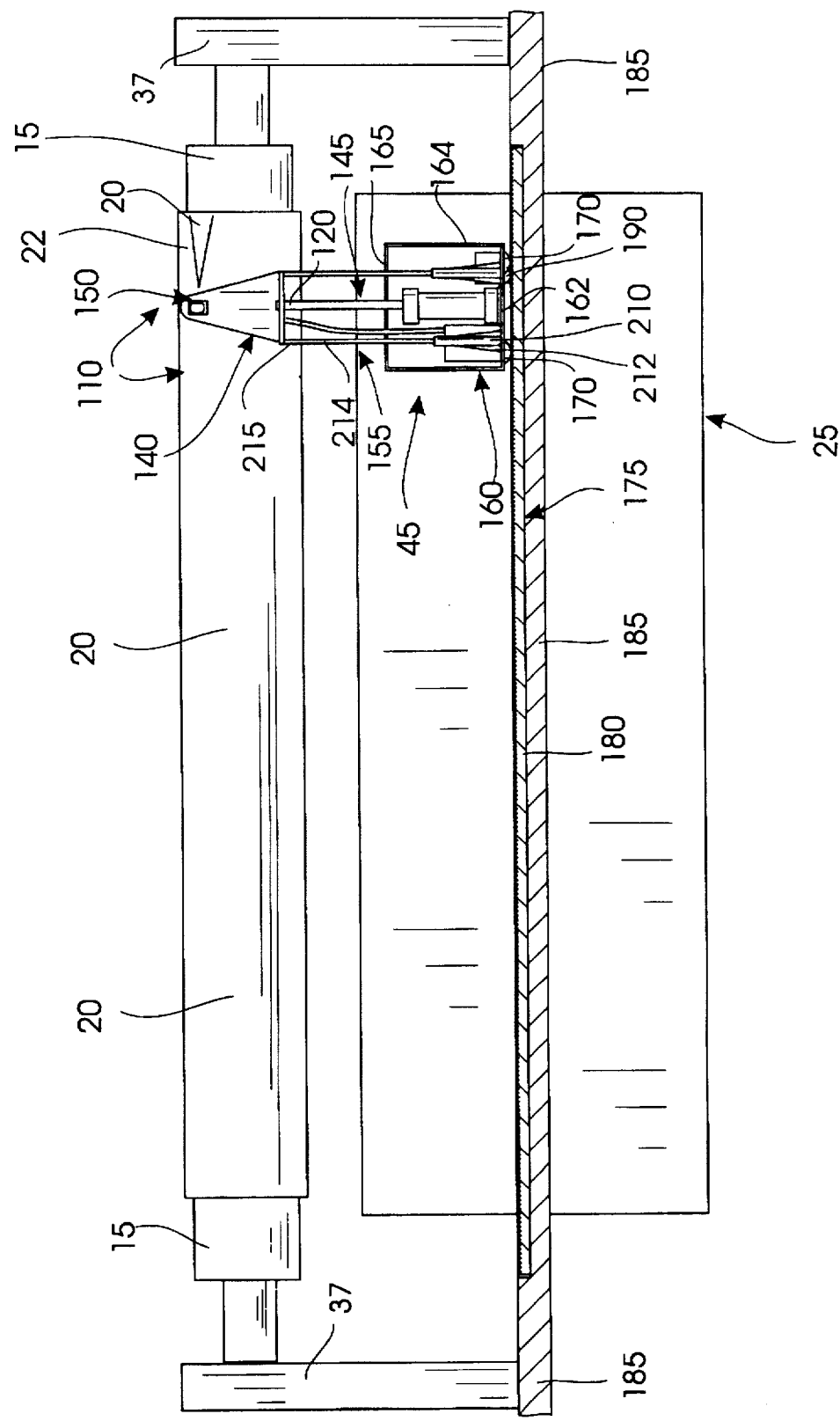
FIG. 4 is a partially fragmented rear elevational view of the first device.

More particularly, the preferred embodiment of our slabbing method for the dry end of a papermaking process is carried out in several steps some of which are repeated. Initially, with attention directed to FIGS. 1–4, please note that the first step 30 is to remove a spool 15 of unwanted paper 20 from the dry end of a papermaking machine. The spool 15 of unwanted paper 20 is then mounted via step 35 on a pair of spaced apart rails 37 (FIG. 4). Preferably the spool 15 is mounted over an inclined, tiltable pulper dump table 25. The spool 15 is then secured or locked via step 40 to prevent rotation during the slabbing process 10. A high pressure fluid cutter 12 is supported via step 42 by a carriage 45 beside, or upon overhead carriage 50 above, the spool 15 of paper 20. Sensors associated with the cutter 12 are used to sense or detect via step 57 the surface 59 of the paper 20. The cutter 12 is adjusted in step 60 horizontally and/or vertically in response to input from the sensors. However, the cutter 12 is maintained in an orientation that will result in the stream 65 emitted by the cutter 12 striking the paper 20 on the spool 15 generally perpendicularly, to the central axis of the spool 15.

Specifically, the high pressure fluid cutter 12 is used to initiate via step 67 a cut 69 in the paper 20 at a first end of the spool 15. The cutter 12 is moved in step 70, generally parallel to the axis of the spool 15, along the length of the spool 15 toward the opposite, second end of the spool 15 slabbing multiple layers of the paper 20 along the way. Hence, the slabbing cut 69 is maintained generally parallel to the central axis of the spool 15. Once the cutter 12 reaches the end of a cut 69, the slabbed paper 22 dropping downwardly is caught in step 75 by the pulper dump table 25 below. The pulper dump table 25 dumps in step 77 the slabbed paper 22 into a pulper associated with the papermaking process, for reprocessing. Another cut is then initiated at the second, opposite end of the spool 15 and the cutter 12 is moved, parallel with the spool's axis, back toward the first end. The initiating and moving steps are repeated until the sensor no longer detects paper 20 on the spool 15 at which time the cutter 12 is deactivated.

Two alternative embodiments of devices used to carry out our slabbing method 10 are illustrated. The first embodiment is broadly designated by the reference numeral 110 in FIGS. 2 through 6. It is comprised of a wheeled carriage 45 operatively mounting an articulated high pressure fluid cutter 12, such as a water knife 12. Shields or guards are associated with the cutter 12 to prevent inadvertent contact with the cutting stream 65 and to confine overspray, but have been redacted from the illustrations for purposes of clarity. The cutter 12 is mounted to the carriage 45 via a framework 140 and horizontally and vertically extensible cylinders 145 and 150. These cylinders 145 and 150 may be either hydraulic or pneumatic, and the vertically displaceable cylinder 145 is stabilized by collateral telescopic stanchions 155. The angle of the cutter 12 may be varied to provide an optimal cutting angle.

Figure 2:
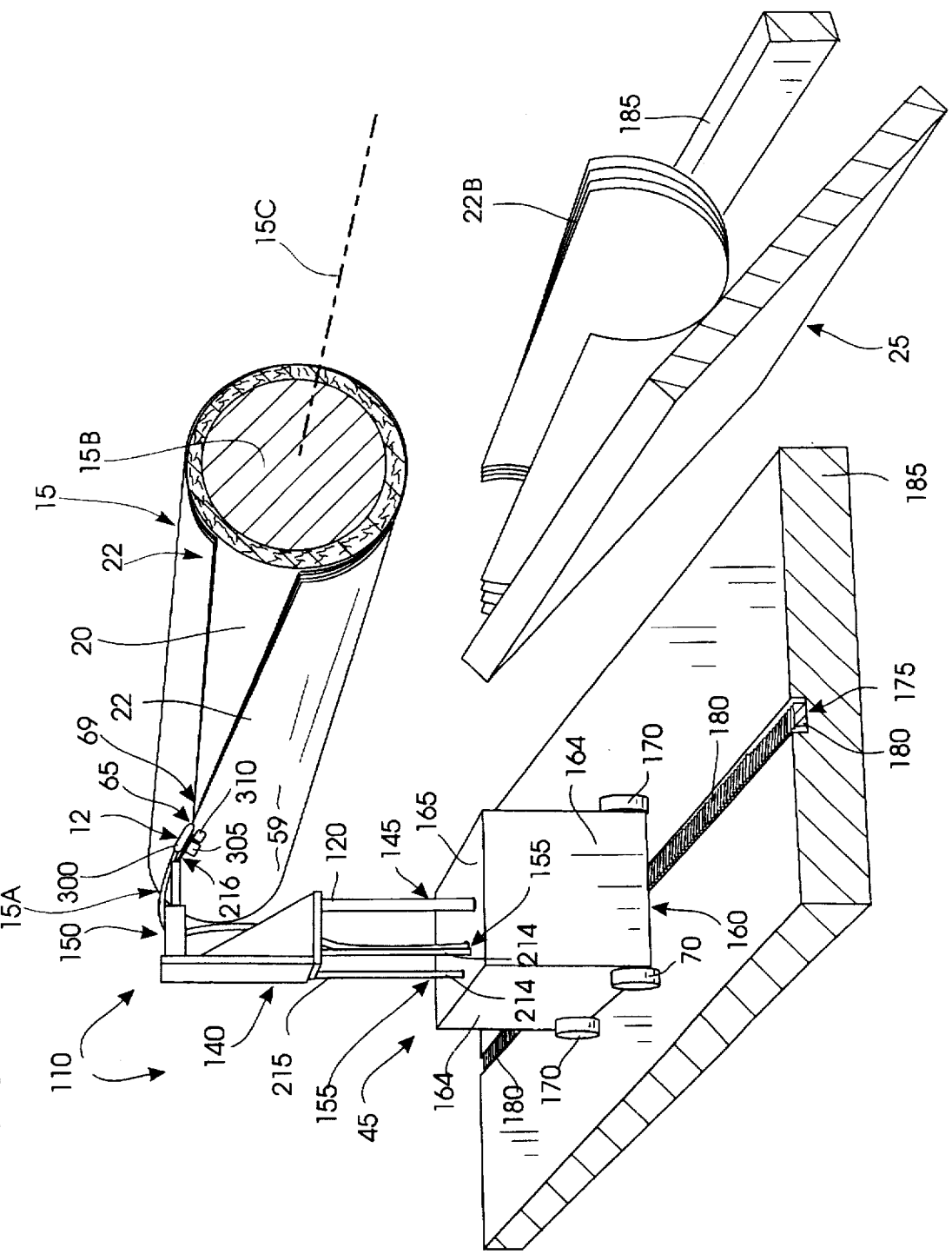
FIG. 2 is a partially fragmented and exploded isometric pictorial view of a primary embodiment of our method with portions thereof shown in sections for clarity.

The carriage 45 comprises a body 160 comprising a base 162, sidewalls 164 and a top 165. One or more of the sidewalls 164 are removable to allow access to the components within. A set of ground contacting wheels 170 are mounted to the body 160 near the base 162. Preferably these wheels 170 are undriven. However, several alternative embodiments call for the wheels 170 to be driven and/or steering. The carriage 45 is intended to move generally parallel to the paper 20 spool 15. Several alternative track systems 175 can be employed to direct and/or move the carriage 45 along the length of the spool 15. One embodiment employs a rack gear track 180 embedded in the floor 185 generally parallel to the spool 15 (FIG. 2). A driven pinion gear 190 engages the rack 180 to move the carriage 45 along the rack gear 180 providing transverse displacement generally parallel to the spool 15. A first alternative embodiment for guiding the carriage 45 comprises a track 205 (FIG. 5) mounted to, or embedded in, the floor 185 generally parallel to the spool 15 and a driven or undriven wheel 195 or guide foot 200 extending downward from the carriage 45 to engage the track 205.

Figure 6:
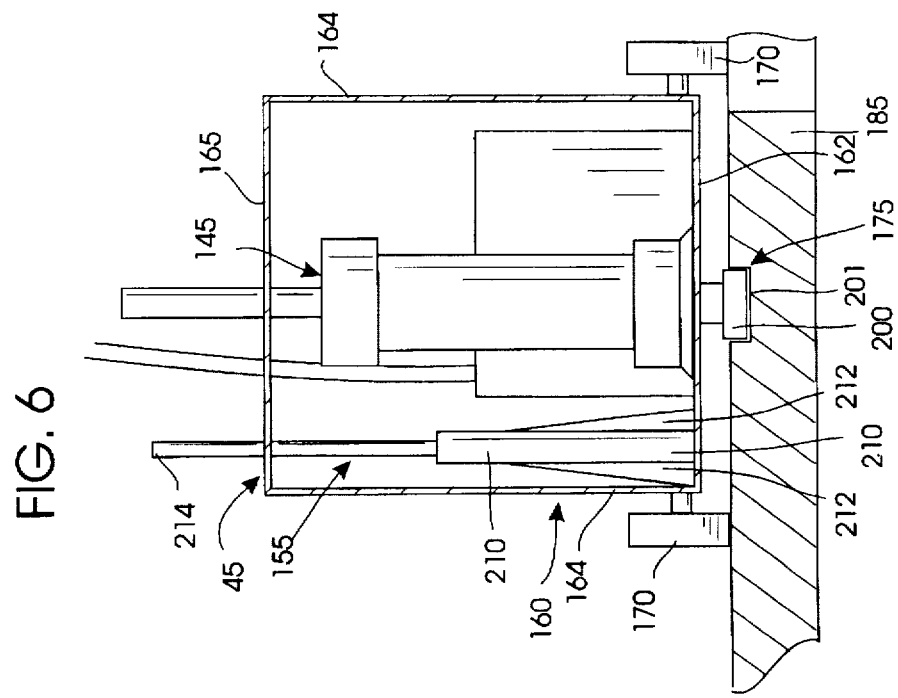
FIG. 6 is a fragmented, enlarged side view of a second alternative embodiment of the first device, employing a guide foot and channel to guide the device.
Figure 5:
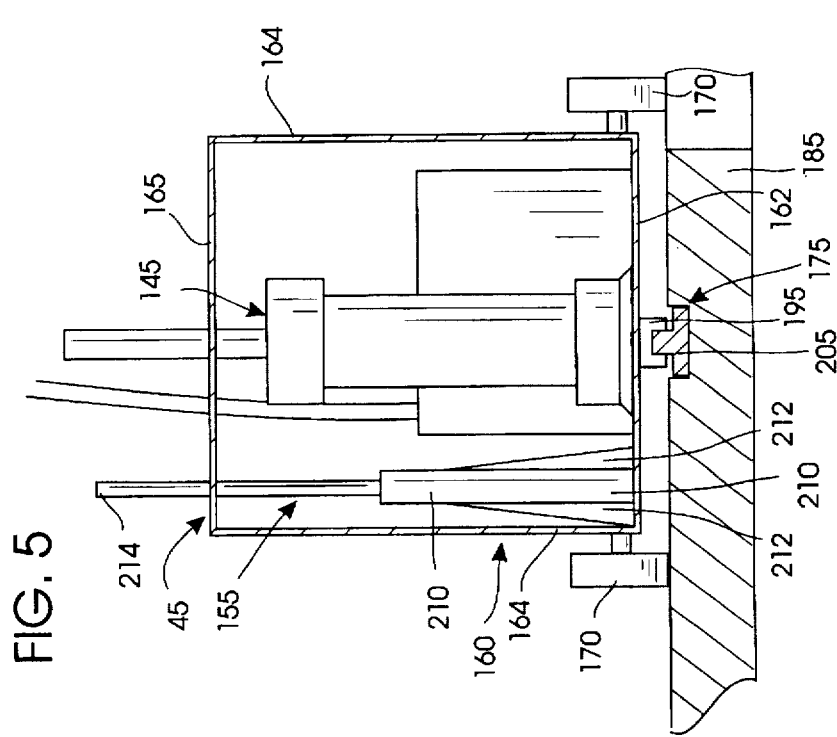
FIG. 5 is a fragmented, enlarged side view of a first alternative embodiment of the first device.

With reference to FIG. 6, another alternative embodiment employs a channel 201 defined in the floor 185 and a guide foot 200 or guide wheel 195 extending downward from the carriage 45 to fit within the channel 201. A final embodiment employs a guide wire embedded in the floor 185 and sensing equipment within the carriage 45 or a similar guidance mechanism. An electromagnetic signal transmitted from the wire is sensed by equipment in the carriage 45, or the equipment in the carriage 45 senses the presence of the wire, and the direction of the cart is varied accordingly to maintain travel generally parallel to the spool 15. These alternative embodiments of the carriage 45 may be self propelled by driving the wheels 170 of the carriage 45, or in the case of the first or second alternative, the track or channel contacting wheel may be driven. Alternatively, transverse displacement may be provided by one or more winches mounted beyond the ends of the spool 15 and connected to the carriage 45 via a cable arrangement.

The vertical lift cylinder, or cylinders 145, are anchored to the base 162 of the carriage 45 and extend upwardly to raise and lower the cutter 12 relative to the centerline of the spool 15. The vertical cylinder 145 is attached at its upper end 120 to a framework 140 which in turn mounts the laterally extensible cylinder 150 which extends and retracts the cutter 12. relative to the paper 20 disposed on the spool 15. Anti-oscillation and thrust support telescopic stanchions 155 extend upwardly from the base 162 of the carriage 45 to the framework 140 to stabilizing the cutter 12. The telescopic stanchions 155 are each comprised of a lower sleeve 210, which is rigidly anchored to the base 162 of the carriage 45 and stabilized by gussets 212. The lower sleeves 210 receive shafts 214. The upper end 215 of the shaft 214 is secured to the framework 140. Alternatively, the cutter 12 is angularly displaceable. An operatively rotatable mount 216 secures the cutter 12 to the laterally extensible cylinder 150. The adjustment of the mount may be active via a crank and actuation cylinder or solenoid arrangement or it may be purely manual, locking in place prior to operation of the device 110.

Figure 7:
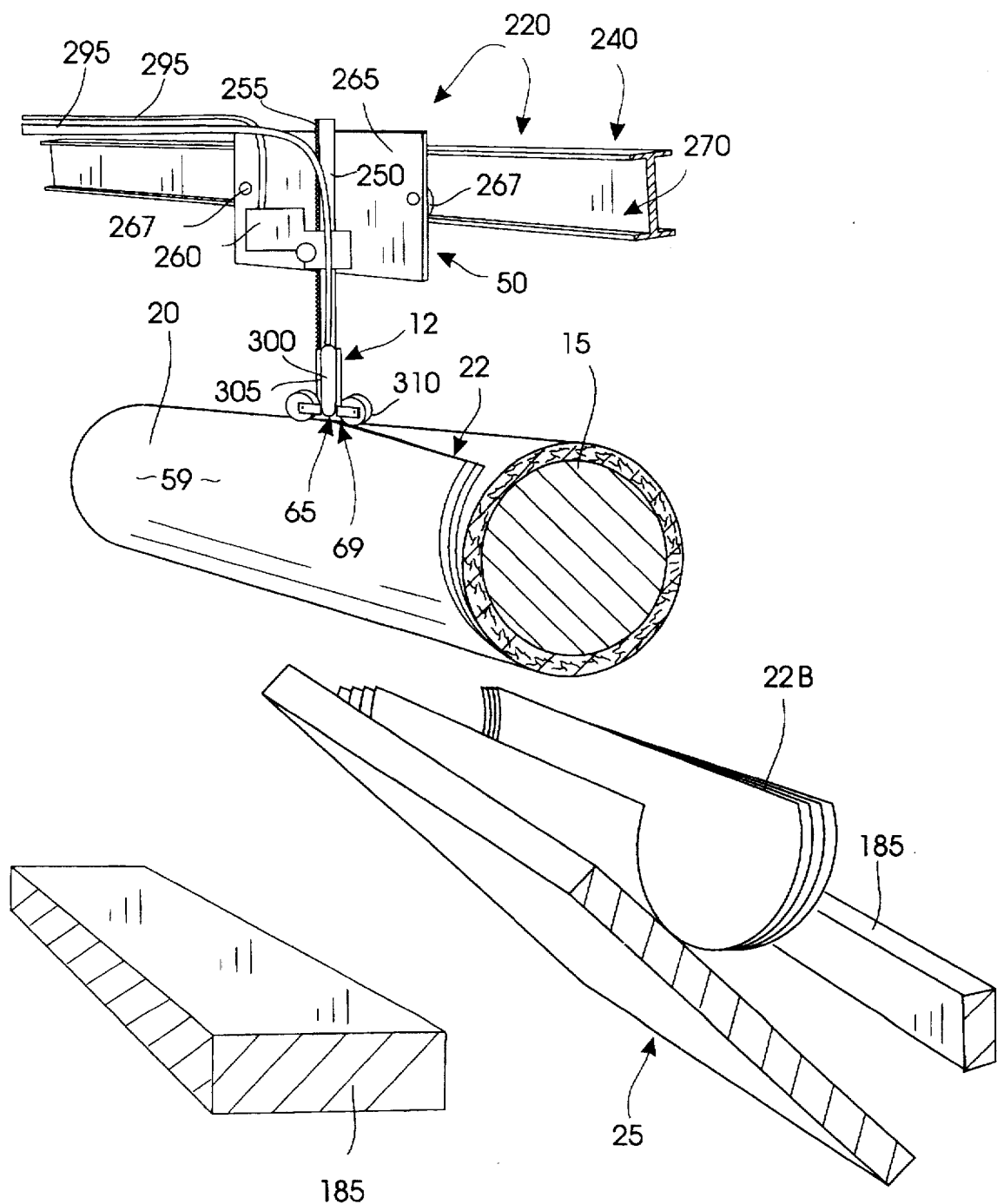
FIG. 7 is a fragmented isometric environmental view of a second device embodying our slabbing process in operation.
Figure 8:
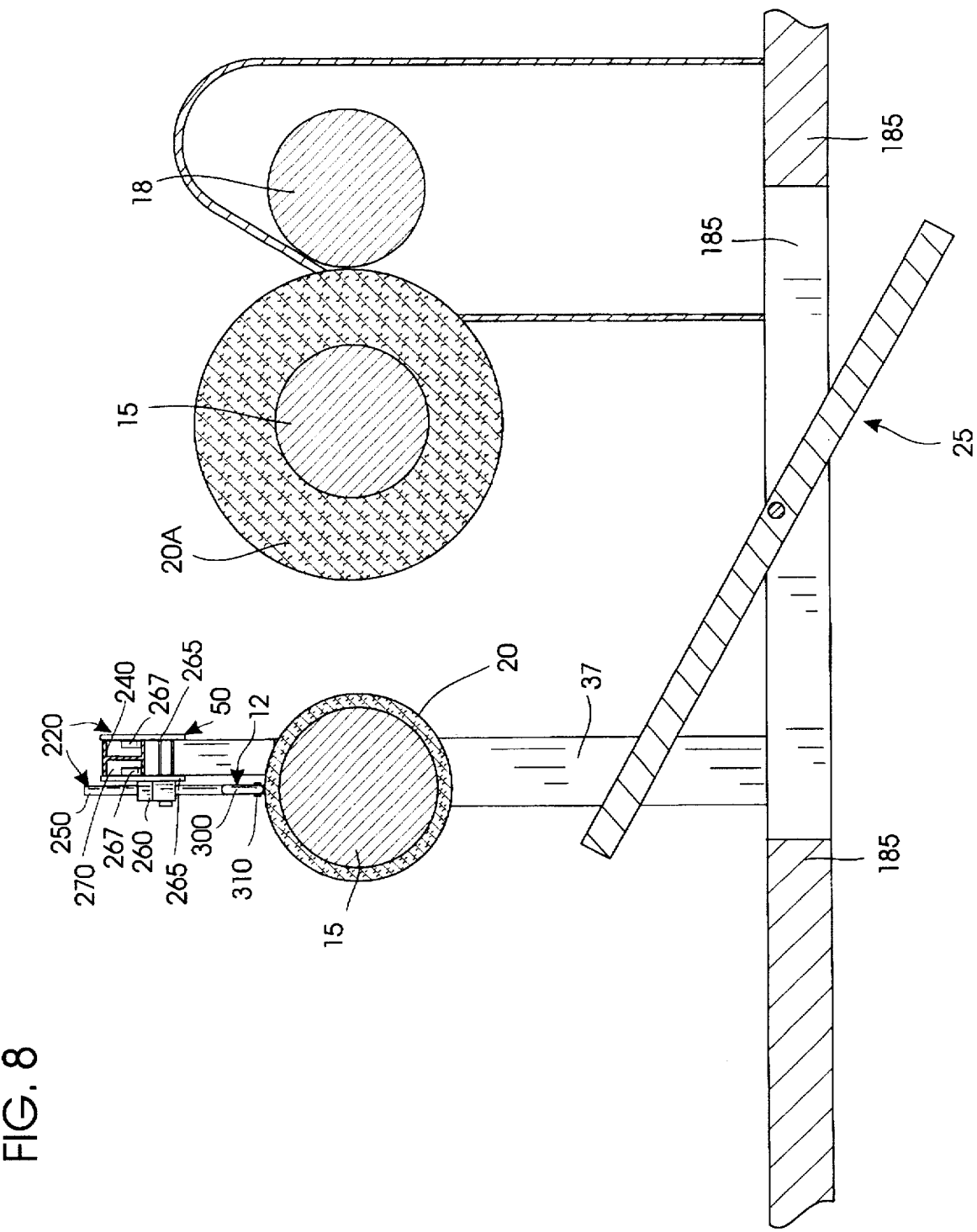
FIG. 8 is a partially fragmented side elevational environmental view of the second device; and, FIG. 9 is a partially fragmented rear elevational view of the second device in operation.
Figure 9:
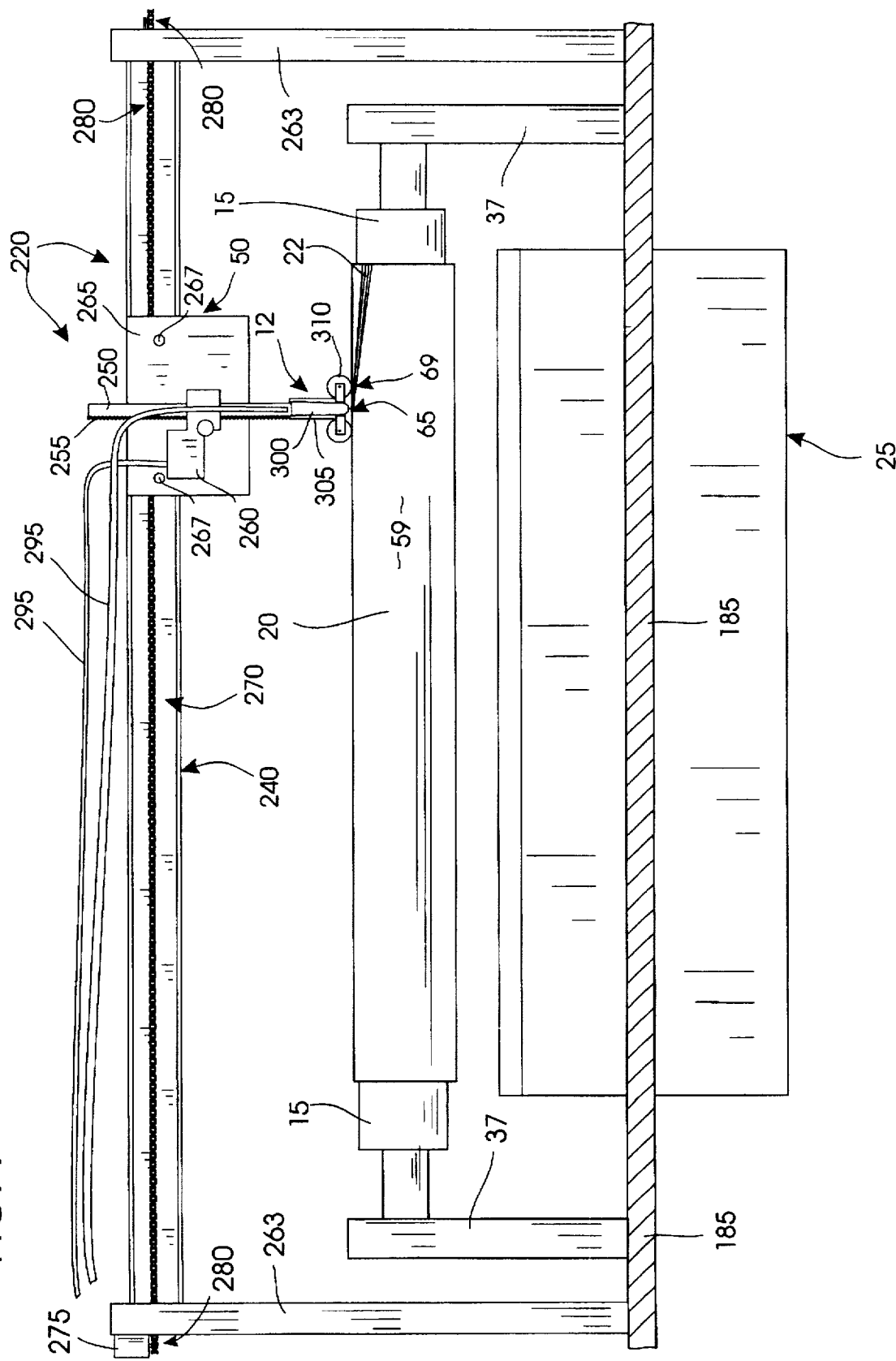

A second illustrated embodiment is broadly designated by the reference numeral 220 in FIGS. 7 through 9. It is comprised of an overhead carriage 50 operatively mounting an articulated high pressure fluid cutter 12, such as a water knife 12. The overhead carriage 50 is in turn mounted on an overhead track beam 240. The cutter 12 is mounted to the overhead carriage 50 via a vertically extensible column 250. Vertical displacement of the cutter 12 can be carried out by providing the column 250 with gear teeth 255 to mesh with a gear drive 260 mounted to the overhead carriage 50. Alternatively, the column 250 itself can be a hydraulic or pneumatic cylinder. The angle of the cutter 12 may be varied to provide an optimal cutting angle which is generally perpendicular to the axis of the spool 15. The beam 240 is preferably constructed of an "T" or "H" beam material to provide an "I" shaped cross-section. The beam 240 is supported by a pillar 263 at each end.

The overhead carriage 50 comprises a body 265 mounting a set of casters 267 which index with the webs 270 of the track beam 240. The overhead carriage 50 moves along the beam 240 during slabbing operations. The overhead carriage 50 can be moved along the beam 240 by a winch and cable setup or, as illustrated by a motor 275 driven chain and sprocket 280 arrangement (FIG. 9). The hoses and/or power lines 295 associated with the cutter 12 and vertically extensible column 250 are routed along the beam 240 clear of the path of travel of the overhead carriage 50.

As mentioned above, both embodiments employ a water knife 12 or a similar high pressure cutter 12 to cut multiple layers of paper 20 simultaneously from the spool 15. A water knife 12 is particularly well suited for this operation. The water will help to suppress any dust or fine particles produced during cutting. Additionally, the paper 22 slabbed from the spool 15 will be redirected to the pulper. Therefore, it is acceptable that the unwanted paper 20 absorb water from the slabbing process. Finally, a water knife 12 will cut through multiple layers of paper 20 without the need for replacing dull blades and without the danger of breaking blades. The orifice defining jet mounted within the nozzle 300 of the cutter 12 can be changed to provide optimal cutting. Additional control of the depth of the cut is accomplished by raising or lowering the pressure of the water provided to the cutter 12.

Sensors generally associated with the cutter 12 control the cylinders 145 and 150 (FIG. 2) or gear drive 260 (FIG. 7) properly position the cutter 12 relative to the paper 20. The devices 110 and 220 employ at least one contact switch 305 mounted near the nozzle 300 of the cutter 12. The preferred embodiment of the devices 110 and 220 employ a pair of spring biased, spaced apart, paper contacting wheels 310 which in turn each open and close an individual contact switch 305. Thereby, the devices 110 and 220 can sense not only the distance to the paper 20 but also the beginning and end of the paper 20 disposed on the spool 15. Therefore, the cutter 12 can be shut off at the end of the paper 20 before contact with the spool 15 to avoid excessive overspray which could damage nearby finished paper product 20A. The switches 305 can directly control valves associated with the horizontal and vertical displacement cylinders 145 and 150 or the gear drive 260. Preferably the cylinders 145 and 150 or gear drive 260 are controlled by a programmable logic controller using the data from the sensor switches 305. When a leading switch 305 is closed, the cutter 12 is activated a given distance of transverse travel later. Later in the cut 69, when the same leading switch 305 is opened, the cutter 12 is deactivated a given distance of transverse travel later to end the cut 69. When both switches 305 are open, the horizontal displacement cylinder 150 or gear drive 260 moves the cutter 12 closer to the spool 15. When the switch or switches 305 contact the surface 59 of the paper 20 disposed on the spool 15, the cylinders 145 and 150 or gear drive 260 to come to rest with the cutter 12 properly positioned for a cut 69. Feedback from the switch or switches 305 provided to the horizontal displacement cylinder 150 or gear drive 260 during the cut 69 insure proper penetration of the cut 69.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense. For example, a rigid blade or very high pressure air can be employed to cut the paper disposed on the spool. Any fluid steam of sufficiently narrow width and strength can be employed to cut multiple layers of paper from the spool.

What is claimed is:

1. A paper slabbing method comprising the steps of:
   positioning an elongated, generally cylindrical reel spool of paper to be slabbed in a convenient position where paper cut therefrom may readily drop, the reel spool comprising a longitudinal axis, a radial periphery, and a pair of spaced apart ends;
   positioning a high pressure fluid cutter adjacent said spool with structure that independently supports the fluid cutter without contacting the spool and which does not support the weight of the spool;
   automatically cutting multiple layers of paper with said high pressure fluid cutter to separate paper without damaging said spool, wherein said automatic cutting step comprises the steps of:
   detecting the presence or absence of paper at an end of said spool;
   initiating a cut of multiple layers of paper with said fluid cutter at said end in response to said detecting step if paper is detected;
   displacing said fluid cutter in a third direction generally parallel with said axis of said spool towards an opposite end of said spool to complete a cut in response to said initiating step;
   sensing the completion of said cut;

recycling paper separated and dropping from said spool during said cut to a pulper; and, repeating said last-mentioned detecting, moving, initiating, displacing, sensing and recycling steps until said spool is free of paper.

2. The slabbing method defined in claim 1 wherein said positioning step comprises the step of supporting said fluid cutter upon a movable carriage disposed generally adjacent said spool and said displacing step comprises the step of moving said carriage linearly along a guide track to make cuts that are parallel with the spool axis.

3. The slabbing method defined in claim 2 including the step of generating said movements in said second direction generally perpendicular to said spool axis with hydraulic means extending vertically upwardly from said carriage to support said fluid cutter.

4. The slabbing method defined in claim 2 wherein said displacing step comprises the step of detecting a signal emitted by guide wire means, said guide wire means embedded in a floor adjacent said spool, and wherein said displacing step includes the step of controlling said carriage with said signal.

5. A paper slabbing method for cutting waste paper from a spool, the spool comprising a longitudinal axis, a radial periphery, and a pair of spaced apart ends, the slabbing method comprising the steps of:

providing a high pressure fluid cutter adjacent said spool;

mechanically supporting said fluid cutter with displaceable structure that does not contact the spool and which does not support the weight of the spool;

automatically cutting multiple layers of paper with said fluid cutter to separate paper without damaging said spool, wherein said automatic cutting step comprises the steps of:

detecting the presence or absence of paper at an end of said spool;

moving said high pressure fluid cutter in a first direction generally towards or away from said spool and a second direction generally perpendicularly with respect to said spool axis;

initiating a cut of multiple layers of paper with said fluid cutter at said end in response to said detecting step if paper is detected;

displacing said fluid cutter in a third direction generally parallel with said axis of said spool towards an opposite end of said spool to complete a cut;

sensing the completion of said cut;

recycling paper separated and dropping from said spool during said cut; and, repeating said last-mentioned detecting, moving, initiating, displacing, sensing and recycling steps until said spool is free of paper.

6. The slabbing method defined in claim 5 wherein said positioning step comprises the step of supporting said fluid cutter upon a movable carriage disposed generally adjacent said spool and said displacing step comprises the step of moving said carriage linearly along a guide track to make cuts that are parallel with the spool axis.

7. The slabbing method defined in claim 6 including the step of generating said movements in said second direction generally perpendicular to said spool axis with hydraulic means extending vertically upwardly from said carriage to support said fluid cutter.

8. The slabbing method defined in claim 6 wherein said displacing step comprises the step of detecting a signal emitted by guide wire means embedded in a floor adjacent said spool, and wherein said displacing step includes the step of controlling said carriage with said signal.

9. A paper slabbing method for cutting waste paper from a spool, the spool mechanically supported by suitable support structure over a pulper dump table and comprising a longitudinal axis, a radial periphery, and a pair of spaced apart ends, the slabbing method comprising the steps of:

providing a high pressure fluid cutter adjacent said spool without contacting said support structure;

mechanically supporting said fluid cutter above said spool of paper to be slabbed without interfering with the spool supporting structure with fluid cutter support structure that does not contact the spool and which does not support the weight of the spool;

automatically cutting multiple layers of paper with said fluid cutter to separate paper without damaging said spool, wherein said automatic cutting step comprises the steps of:

detecting the presence or absence of paper at an end of said spool;

moving said high pressure fluid cutter in a first direction generally towards or away from said spool and a second direction generally perpendicularly with respect to said spool axis whereby the cutter is dynamically disposed at a selected position about the radial periphery of said spool;

initiating a cut of multiple layers of paper with said fluid cutter at said end in response to said detecting step if paper is detected;

displacing said fluid cutter in a third direction generally parallel with said axis of said spool towards an opposite end of said spool to complete a cut;

sensing the completion of said cut;

recycling paper separated and dropping from said spool during said cut to a pulper; and, repeating said last-mentioned detecting, moving, initiating, displacing, sensing and recycling steps until said spool is free of paper.

10. The slabbing method defined in claim 9 wherein said positioning step comprises the step of supporting said fluid cutter upon a carriage suspended from an overhead track above said spool, and wherein said displacing step comprises the step of moving said carriage linearly along said track to make cuts that are parallel with the spool axis.

11. The slabbing method defined in claim 10 including the step of generating said movement in said second direction generally perpendicular to said spool axis with power drive means extending vertically downwardly from said carriage to said fluid cutter.

12. The slabbing method defined in claim 10 wherein said displacing step comprises the steps of moving said carriage horizontally and supporting it vertically above said spool.

* * * * *